United States Patent [19]

Prinz et al.

[11] Patent Number: 4,527,969

[45] Date of Patent: Jul. 9, 1985

[54] APPARATUS FOR THE ELECTRIC PRETREATMENT OF NON-CONDUCTIVE FOILS

[75] Inventors: Eckhard Prinz, Rotenbek; Bruno Kluss, Hamburg, both of Fed. Rep. of Germany

[73] Assignee: Softal Electronic GmbH, Hamburg, Fed. Rep. of Germany

[21] Appl. No.: 493,318

[22] Filed: May 10, 1983

[30] Foreign Application Priority Data

May 25, 1982 [DE] Fed. Rep. of Germany ....... 3219538

[51] Int. Cl.³ .......................... B29D 7/22; H01T 19/04
[52] U.S. Cl. ............................... 425/174.8 E; 264/22; 425/73; 425/75
[58] Field of Search ................. 425/174.8 E, 174.8 R, 425/73–75; 264/22, 25, 26, 24

[56] References Cited

U.S. PATENT DOCUMENTS

| | | | |
|---|---|---|---|
| 2,859,480 | 11/1958 | Berthold et al. | 264/22 |
| 2,881,470 | 4/1959 | Berthold et al. | 264/22 |
| 2,939,956 | 6/1960 | Parks | 250/325 |
| 3,196,063 | 7/1965 | Paquin et al. | 264/22 |
| 3,491,009 | 1/1970 | Ramaika | 264/22 |
| 4,038,354 | 7/1977 | Remmington et al. | 264/216 |
| 4,157,236 | 6/1979 | Busker et al. | 425/174.8 E |
| 4,268,464 | 5/1981 | Yoshino et al. | 264/22 |
| 4,298,440 | 11/1981 | Hood | 425/174.8 E |
| 4,308,370 | 12/1981 | Fukada et al. | 264/22 |
| 4,309,368 | 1/1982 | Groves | 264/22 |
| 4,334,144 | 6/1982 | Ferrarini | 264/22 |
| 4,403,168 | 9/1983 | van Leeuwen | 425/174.8 E |

FOREIGN PATENT DOCUMENTS

| | | | |
|---|---|---|---|
| 606481 | 6/1960 | Italy | 264/22 |
| 46-43480 | 12/1971 | Japan | 264/22 |
| 46-41719 | 12/1971 | Japan | 264/22 |
| 56-2126 | 1/1981 | Japan | 425/174.8 E |
| 920860 | 3/1963 | United Kingdom | 264/22 |
| 961384 | 6/1964 | United Kingdom | 264/22 |

*Primary Examiner*—Jeffery Thurlow
*Attorney, Agent, or Firm*—Staas & Halsey

[57] ABSTRACT

The apparatus for the electrical pretreatment of foils to increase the surface tension (surface energy) comprising a roller electrode forming a counter-electrode and over which is passed the foil to be treated, and at least three knife electrodes, which are arranged parallel to one another and at right angles to the direction of movement of the foil. The discharge edges of the knife electrodes have a constant spacing from the roller electrode surface, which leads to a much better treatment result.

5 Claims, 1 Drawing Figure

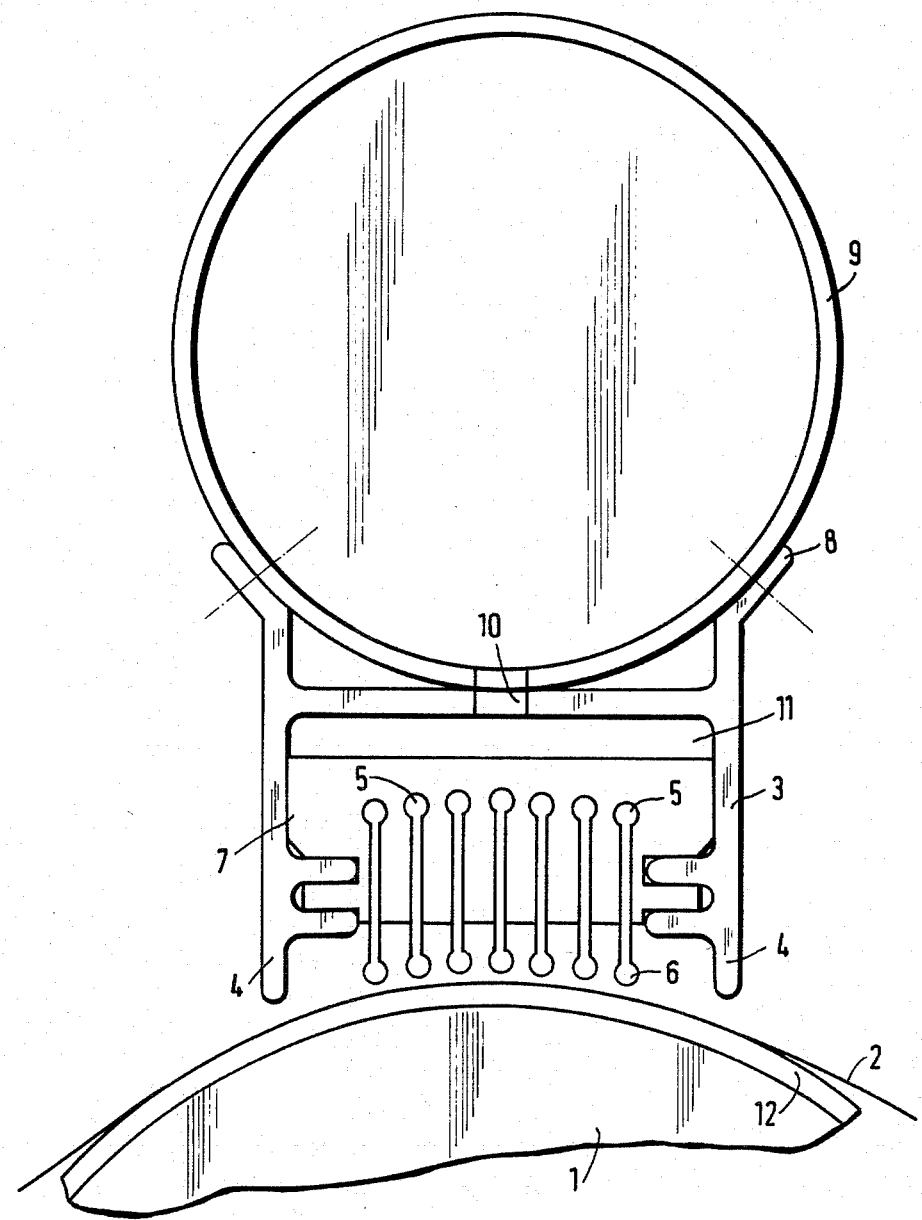

APPARATUS FOR THE ELECTRIC PRETREATMENT OF NON-CONDUCTIVE FOILS

BACKGROUND OF THE INVENTION

The invention relates to an apparatus for the electrical pretreatment of foils to increase the surface tension of the foil using a roller electrode as a first electrode over which the foil is passed, and a knife electrode as the second electrode. The knife electrode is positioned across the foil at right angles to the direction of foil movement, and spaced from the foil to form an air gap in between the knife electrode and the foil.

Many constructions of this type of apparatus are known. The single knife or blade electrode can be replaced by a cross-sectionally U-shaped knife or blade electrode, so that two discharge edges are available, which are parallel to one another and at right angles to the direction of movement of the foil.

SUMMARY OF THE INVENTION

The present invention provides an apparatus of the aforementioned type to achieve a considerable improvement in the ratio of the expended specific energy to the produced treatment result, i.e. the surface tension.

This problem is fundamentally solved in part by providing at least three knife electrodes spaced close to each other (in the range of 7 mm) positioned at right angles to the direction movement of a foil and such that the distance between the discharge edge of each knife and the surface of the foil is constant.

It has proved to be particularly advantageous to construct the discharge edges to have a rounded or semicircular cross section, and to place the knife electrodes in a common casing, which is under a vacuum and has side walls parallel to the knife electodes and extending to the vicinity of the surface of the roller.

Due to the fact that several knife electrodes are arranged parallel to one another and at right angles to the direction of movement of the foil and the fact that the distance from the discharge edges of all the electrodes to the surface of the roller electrode and consequently to the foil is kept substantially constant, much better results have been obtained using the apparatus of the present invention than are achievable with conventional apparatus. This applies in particular in combination with the applied vacuum. Tests have shown that the treatment result is essentially a 100% improvement over results being conventional apparatus. With certain foils, it was possible for the first time to obtain results permitting subsequent further processing by printing or the like.

BRIEF DESCRIPTION OF THE DRAWINGS

The FIGURE illustrates a cross section of a knife electrode of the present invention.

DESCRIPTON OF THE PREFERRED EMBODIMENT

The invention is described in greater detail hereinafter relative to a non-limitative embodiment and the attached drawing, which shows in diagrammatic cross-sectional form an embodiment of the invention. The FIGURE does not show a longitudinal view because this view is made readily apparent from the cross-sectional view in conjunction with the following description.

Apparatuses of this type are used for a variety of foils and films made from plastic, paper or metal, as well as for corresponding composite foils and films. Such apparatuses increase the surface energy or surface tension of the film to enable further processing of the film. For example, the foils must be subsequently printed, bonded or welded. This is only possible if the surface is electrically pretreated, in other words subjected to a corona discharge treatment.

The apparatus shown in the drawing comprises a roller electrode 1, which forms the counter-electrode which is at the potential of earth earth and which is covered with a dielectric 12. Foil 2 is passed over this rotably mounted roller electrode.

The live electrode is placed in a casing 3. In the illustrated embodiment the live electrode is formed by seven knife or blade electrodes 5, whose discharge edges 6 are semicircular or rounded and have a substantially constant spacing with respect to roller electrode and consequently foil 2. Casing 3 is made from plastic, preferably fibreglass-reinforced plastic. This also applies with regards to the electrode holder 7, whereof a corresponding number are arranged in the longitudinal direction, in order to firmly and securely hold the electrodes. A relatively large spacing is longitudinally provided between the individual electrode holders 7.

With its side walls 4, which pass into the vicinity of roller electrode 1, casing 3 forms a vacuum chamber, in which are arranged the knife electrodes 5. The inner area of this vacuum chamber is designated 11 and is connected via a connection 10 with the inner area of a carrier tube 9, which is parallel to roller electrode 1. The vacuum source, which is connected to the inner area of carrier tube 9 is not shown. At 8, carrier tube 9 is connected to casing 3.

It is essential to the invention that a plurality of knife electrodes, preferably with rounded or semicircular discharge edges, are provided and arranged to have a constant spacing from roller electrode 1 and consequently foil 2. Excellent treatment results have been obtained in conjunction with the application of the vacuum, which is stabilized by the downwardly drawn side walls. When using a specific energy (W·min)/m² of 12, a surface tension (mN/m) of 48 was obtained. With a specific energy of 16, the surface tension was approximately 54 and with a specific energy of 20, the surface tension was approximately 58. These results were obtained with a deposited polyethylene foil and represent a substantially 100% improvement compared with known apparatuses used in the same way and with the same specific energy.

A voltage between 10 and 15 kV and a frequency range around 20 KHz were used.

In another, not shown embodiment, for the treatment of conductive foils, e.g. aluminium, the dielectric is not on the roller electrode 1 and instead it is used to cover the knife electrodes 5.

What is claimed is:

1. An apparatus for electrically treating a foil to increase the surface tension of the foil and for connection to a vacuum source, said apparatus comprising:
    a roller electrode, having a circumference and connected to receive a first potential, over which the foil is passed;
    a casing connectable to the vacuum source and having sides positioned close to the roller electrode such that, when said casing is connected to the vacuum source an evacuated area defined by a portion of the circumference of said roller electrode on one side and said casing on the remaining sides is formed; and at least three knife electrodes housed within said casing and connected to receive a second potential higher than said first potential, said knife electrodes being positioned substantially parallel and close to one another and extending across said roller electrode in a direction perpendicular to the direction of travel of the film, the distances between the discharge edges of said knife electrodes and the surface of the roller elctrode being substantially constant.

2. An apparatus according to claim 1, wherein the knife electrodes have cross-sectionally rounded or semi-circular discharge edges.

3. An apparatus according to claim 1, wherein the casing is connected to a carrier tube running parallel to the roller electrode and which is used for the connection to the vacuum source.

4. An apparatus according to claim 2, comprising a total of seven knife electrodes, said knife electrodes arranged with a spacing in the direction of movement of the foil, of approximately 7 mm and the diameter of the semicircular discharge edges of the knife electrodes being approximately 3 mm.

5. An apparatus according to claim 1, wherein the knife electrodes are covered with a dielectric material.

* * * * *